Figures 1, 2:
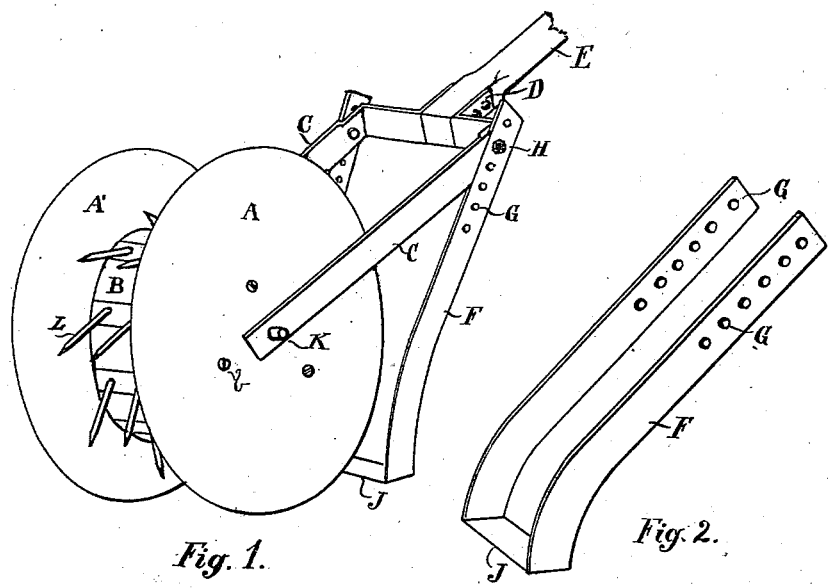

(No Model.)

E. C. ELWELL.
COMBINED PULVERIZER AND WEEDER.

No. 379,308. Patented Mar. 13, 1888.

Witnesses.
George Starr Elwell
Carroll J. Webster

Inventor:
Edward Chandler Elwell,
By William Webster,
his Atty

UNITED STATES PATENT OFFICE.

EDWARD CHANDLER ELWELL, OF SANDUSKY, OHIO.

COMBINED PULVERIZER AND WEEDER.

SPECIFICATION forming part of Letters Patent No. 379,308, dated March 13, 1888.

Application filed June 6, 1887. Serial No. 240,437. (No model.)

*To all whom it may concern:*

Be it known that I, EDWARD CHANDLER ELWELL, a citizen of the United States, residing at Sandusky, in the county of Erie and State of Ohio, have invented certain new and useful Improvements in a Combined Pulverizer and Weeder; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a combined pulverizer and weeder, and has for its object to provide a device that shall be adapted for the cultivation of growing vegetable plants, corn, &c., when being moved between the rows by thoroughly pulverizing the soil, and at the same time destroy the weeds or any noxious growth of vegetation existing therein, provision being made for protecting the plants from being covered by the earth when the pulverizing and weeding action is being effected. I attain these results by the mechanism illustrated in the drawings, in which—

Figures 3, 4:
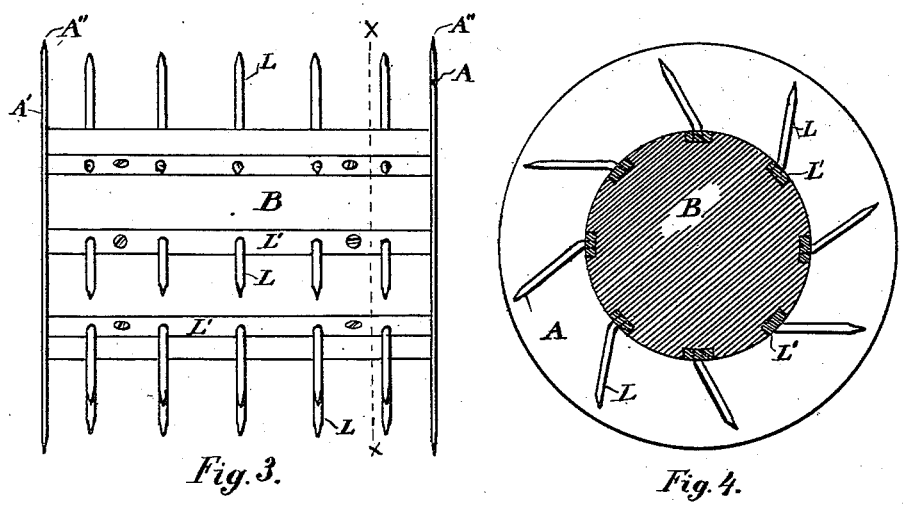

Figure 1 is a perspective view of my device. Fig. 2 is a detail view in perspective showing a knife employed for cutting the weeds below the surface of the earth. Fig. 3 is a front elevation of the cylinder with the pulverizing-teeth attached. Fig. 4 is a section of the cylinder on lines $x$ $x$, Fig. 3.

Like letters of reference indicate like parts throughout the several views.

A and A' are disks with knife-edge peripheries, as shown at A'', and between which is attached cylinder B, preferably by screws $b$, passing through the disks and into the cylinder.

K are gudgeons driven into cylinder B and passing through the disks, serving as an axis for the right-angled draft-irons C, which are firmly attached at their rear ends to handle or draft-pole E. The draft-irons C are formed with an angular offset near the point at which they are bent at right angles of a depth corresponding to the thickness of supports F of the knife J, and into these offsets are securely fastened the supports F by bolts H, passing through irons C and perforations G of supports F. The supports are formed of metal bars slightly curved in the direction of their width, and are bent at right angles, forming an intermediate portion, J, of a width corresponding to that of the cylinder and disks. The portion J is sharpened to form a knife for the purpose of cutting any weeds or grass below the surface of the ground that may be left by the teeth L.

L' are metal bars running parallel across and let into the cylinder a depth corresponding to their thickness, and are securely fastened to the cylinder by screws M.

L are teeth sharpened at their outer end and firmly attached to bars L' in any preferred manner, and are bent tangential to the axis of cylinder B. These teeth may be constructed with a sharp or square edge, as desired.

In operation, when the device is used as a garden implement, the operator, by means of handle E, pushes the device between the rows. The disks by the weight of the cylinder are caused to enter the ground a sufficient distance to cause the teeth to penetrate the necessary depth for cultivation. The teeth, from their inclination from the periphery of the cylinder, entering the ground upon an incline, their initial action is to remove any vegetable growth—such as weeds, grass, &c.—and, passing to the full depth of their penetration, leave the earth upon the same incline from the axis of the cylinder, effectually pulverizing the soil. The knife J following immediately in rear of the toothed cylinder and beneath the surface of the ground a distance corresponding to the penetration of the teeth, any remaining roots of weeds, &c., are severed and the soil is again moved by the action of the knife.

During the operation just described the disks can be run close by the side of the tender plants, as the disks act as shields to protect the plant from being covered by the soil as it is being agitated, thereby enabling the operator to cultivate and weed in close proximity to the rows.

It will be observed that by means of perforations G in supports F the knife can be adjusted at will.

It may be thought desirable to construct the knife separate from supports F, in order to remove the same for the purpose of sharpening or substituting a new knife when necessary, and for use in some soils the knife may be of a width corresponding to the length of the cylinder and supports F formed to rest just within the disks to act as a scraper or cleaner for the same when there is a tendency of the soil to adhere to the disks, the draft-irons C serving at all times to clear the outer surface of the disks under like conditions.

While I prefer to construct the cylinder of wood and attach the disks thereto, as described, I may construct these parts integral without departing from the spirit of my invention.

When it is desired to use my device for cultivating corn, it should be constructed of a size and weight sufficient for this heavier work and animal-power employed by attaching a pole or thills to gudgeons K.

Having described my invention, what I claim, and desire to secure by Letters Patent, is—

1. In a combined pulverizer and weeder, a toothed cylinder having disks with knife-edge peripheries, in combination with a cutting device in rear thereof, as and for the purpose set forth.

2. A combined pulverizer and weeder having a toothed cylinder provided with a disk at each end, the disks being sharpened at their peripheries, gudgeons passing through the axial center of the disks, a rectangular frame provided with a handle journaled upon the gudgeons, knife-supports adjustably attached to the frame, and a knife connected with the supports and extending the width of the frame, as and for the purpose set forth.

In testimony that I claim the foregoing as my own I hereby affix my signature in presence of two witnesses.

EDWARD CHANDLER ELWELL.

Witnesses:
S. C. WHEELER,
JACOB SCHNELL.